Dec. 4, 1951   R. E. WISSMAN   2,577,641
MULTIPLE DRIVE PRESS WITH MULTIPLE CLUTCH
Filed May 5, 1950   4 Sheets-Sheet 2

INVENTOR
REUBEN E. WISSMAN
By
Toulmin & Toulmin
ATTORNEYS.

Patented Dec. 4, 1951

2,577,641

UNITED STATES PATENT OFFICE 2,577,641

MULTIPLE DRIVE PRESS WITH MULTIPLE CLUTCH

Reuben E. Wissman, Minster, Ohio, assignor to The Minster Machine Company, Minster, Ohio, a corporation of Ohio Application May 5, 1950, Serial No. 160,327

7 Claims. (Cl. 192—4)

This invention relates to mechanical power presses and particularly to geared type presses with twin driving gears.

In mechanical power presses having either substantial width, long strokes, heavy tonnage capacity, or a combination thereof, it is common practice to place a drive gear on each end of the crankshaft of the press and drive both gears simultaneously through a backshaft that carries pinions at each end of the backshaft which cooperate with the gears on each end of the crankshaft. The primary drive for the press is through the backshaft of the press. To control the starting and stopping of the crankshaft, a clutch-brake assembly is mounted on the backshaft, usually between the flywheel and the gears so that the flywheel can rotate continuously.

In a drive of the aforementioned type, the gears are constantly in mesh and there is a fixed relationship between the crankshaft and the gears, that is, any fixed point on the periphery of the main drive gear on the crankshaft remains in the same fixed radial position relative to the crankshaft at all times. Thus, the load of the pressing operation is always taken on the same teeth of the driving gears and the pinions without any opportunity of transferring the load between the various teeth on the gears.

In my application Serial No. 143,778, filed February 11, 1950, there is disclosed my invention for geared type presses, wherein a clutch-brake assembly is mounted on the crankshaft of the press with the clutch drivingly connected between the gear of the press and the crankshaft, so the gear can rotate continuously with a resultant starting and stopping of only the crankshaft and the mechanism driven thereby to avoid the necessity of starting and stopping the gear train. Such an arrangement provides overload protection to the operation of the press, and avoids the load always being taken by certain teeth in the gear train, but the driving torque to the crankshaft is applied solely at one end of the crankshaft.

In mechanical power presses having either substantial width, long strokes, heavy tonnage capacity, or a combination thereof, the application of the driving torque to the crankshaft at only one end of the crank shaft produces a substantial torque in the crankshaft during the operation of the press.

It is, therefore, an object of this invention to provide a mechanical press of the geared type having a backshaft drive to the gears of the press that are mounted at opposite ends of the crankshaft in which a clutch-brake assembly is mounted on one end of the crankshaft between the crankshaft and the gear on that end of the crankshaft, and a clutch assembly is mounted on the opposite end of the crank shaft between the crankshaft and the gear on the crankshaft at that end thereof to provide for uniform application of torque to the crank shaft at both ends thereof simultaneously, thus avoiding the development of torque in a crankshaft having a substantial length, long stroke, heavy tonnage, or a combination thereof.

It is also an object of the invention to provide a mechanical power press in accordance with the foregoing object, wherein the clutch-brake assembly on one end of the crankshaft provides the primary control of the starting and stopping of the press, by which sensitive operation of the press can be obtained and wherein the clutch on the opposite end of the crankshaft is caused to function during only a part of the stroke of the press during which the high capacity of the press is to be utilized. When both clutches are engaged a uniform pressure is established on the twin driving gears, the driving torque to the crankshaft is uniformly applied through both gears and sensitive operation of the press to overload conditions is obtained to give overload protection to the press.

Since in my invention the clutch-brake assembly is mounted on the crankshaft and disposed between the crankshaft and the driving gear which rotates freely relative to the crankshaft, the clutch-brake assembly is not required to start and stop the gear train which includes the twin driving gears that are required to be controlled as when the clutch-brake assembly is carried on the backshaft of the press. To this end, a more uniform power curve is obtained on the main drive motor for twin driven presses. Also, with the clutch units being positioned between the gears and the crankshaft, a more sensitive response to overload operation is obtained through the use of one clutch for light load and two clutches at heavy loads or full capacity.

It is therefore another object of the invention to obtain sensitive control of the starting and stopping of the crankshaft of the press by a clutch-brake assembly that is of considerably less capacity than that required to transmit the full torque of the press, and to supplement the torque transmitted by the clutch of the clutch-brake assembly by means of a second clutch driving through the opposite end of the crankshaft, whereby to obtain maximum capacity of the press, particularly during the power stroke of the press, or that portion of the stroke of the press in which maximum power of the press is required.

It is still another object of the invention to provide an automatic control system for operation of the clutch and clutch-brake assembly of the press, which control system can provide for operation of either the clutch-brake assembly by itself for control of the press when working under light pressing conditions or simultaneous operation of the clutches when the press is operating under heavy pressing conditions.

It is still another object of the invention to provide a mechanical press in accordance with the foregoing objects wherein temporary overloads in the press will be absorbed by slippage of the clutch assemblies to prevent damage to such clutches and to the crankshaft, the press frame, or other equipment associated therewith.

Further objects and advantages will become apparent from the drawings and the following description.

In the drawings:

Figure 5 is a schematic electrical system for controlling automatic operation of the press.

Figure 2:
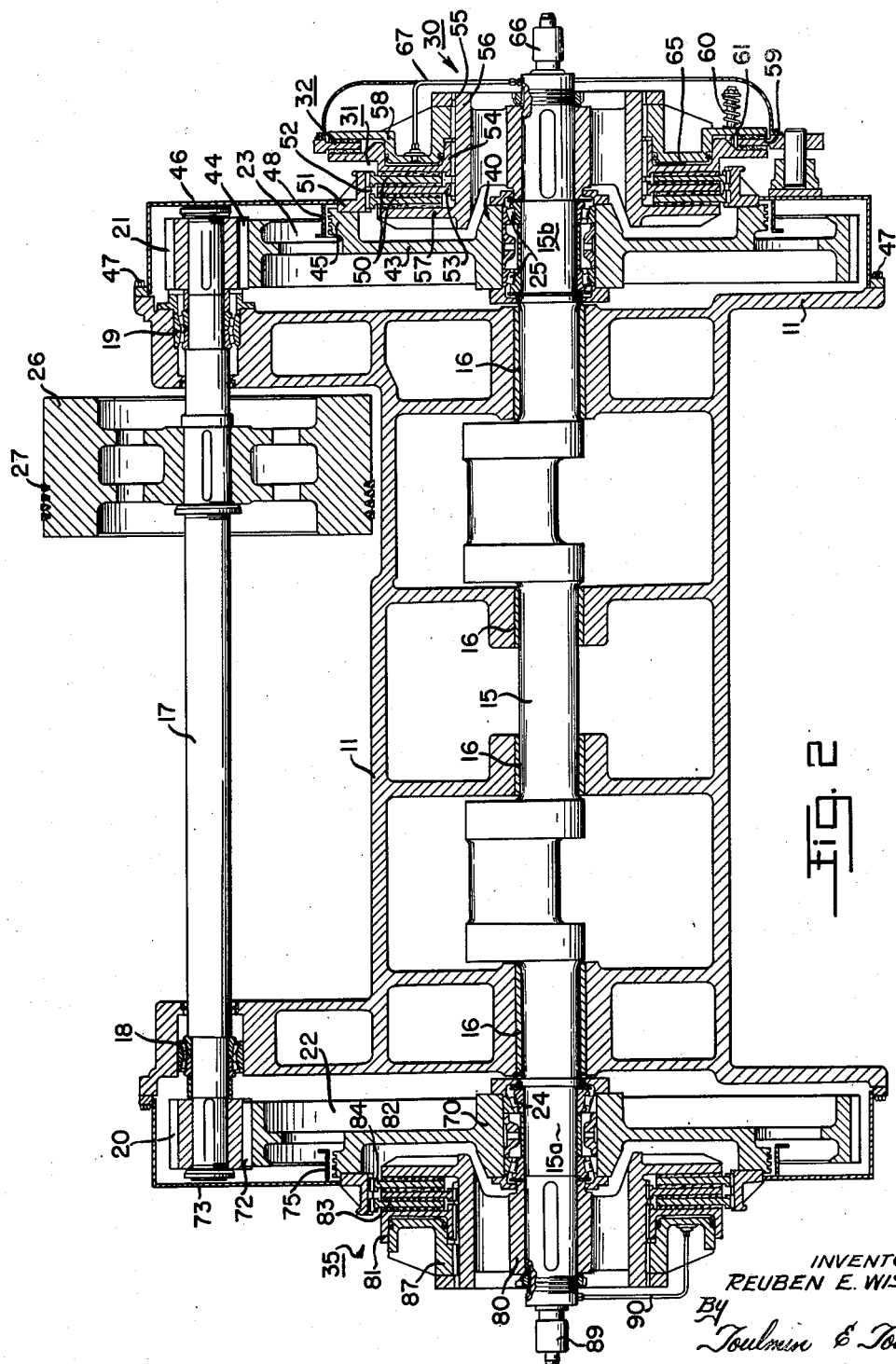
Figure 2 is a horizontal cross-sectional view taken along line 2—2 of Figure 1.

There is disclosed in this invention a mechanical press 10 having a main frame 11 and a bed 12. A platen 13 is suitably guided in the frame 11 for movement relative to the bed 12. The platen 13 is connected by means of connecting rods 14 to a crankshaft 15 that is suitably journalled in the bearings 16 in the frame 11 as illustrated in Fig. 2. The crank shaft 15 has the ends 15a and 15b extending from opposite sides of the press frame 11.

The crankshaft 15 is adapted to be driven from a back shaft 17 which in turn is driven by a fly-wheel 26 suitably connected with a power source by belts 27. This backshaft is journalled in the frame 11 by means of the bearings 18 and 19. Pinions 20 and 21 mounted on opposite ends of the backshaft 17 drive the drive gears 22 and 23, respectively.

The drive gear 22 is carried upon the end 15a of the crankshaft 15 by means of the bearing 24, which is preferably of a roller bearing type to provide for freedom of rotation of the gear 22 on the crankshaft end 15a.

The gear 23 on the end 15b of the crankshaft 15 is journalled thereon by means of the bearing 25 which is preferably of the roller bearing type to provide for freedom of rotation of the gear 23 on the crankshaft end 15b, or the gear 23 could be journalled on a bearing extension on the press frame 11.

A combination clutch-brake unit 30 consisting of the clutch 31 and the brake 32 is carried on the crankshaft end 15b adjacent the gear 23. The clutch 31 drivingly interconnects the gear 23 with the crank shaft end 15b to drive the crank shaft 15 when the clutch 31 is engaged. The brake 32 is provided to stop the rotation of the crank shaft when the clutch is disengaged.

At the opposite end of the crank shaft 15, on the crank shaft end 15a, there is provided a clutch 35 which drivingly interconnects the gear 22 with the crank shaft end 15a to drive the crank shaft 15.

It will thus be seen that the crank shaft 15 is provided with means for driving the shaft from both ends, but that the means for stopping the crank shaft, namely, the brake 32, is provided at only one end of the crank shaft. However, if desired, the identical clutch-brake unit 30 could be applied to the crank shaft end 15a in place of the clutch 35 to provide identical units on both ends of the crank shaft 15.

Figure 3:
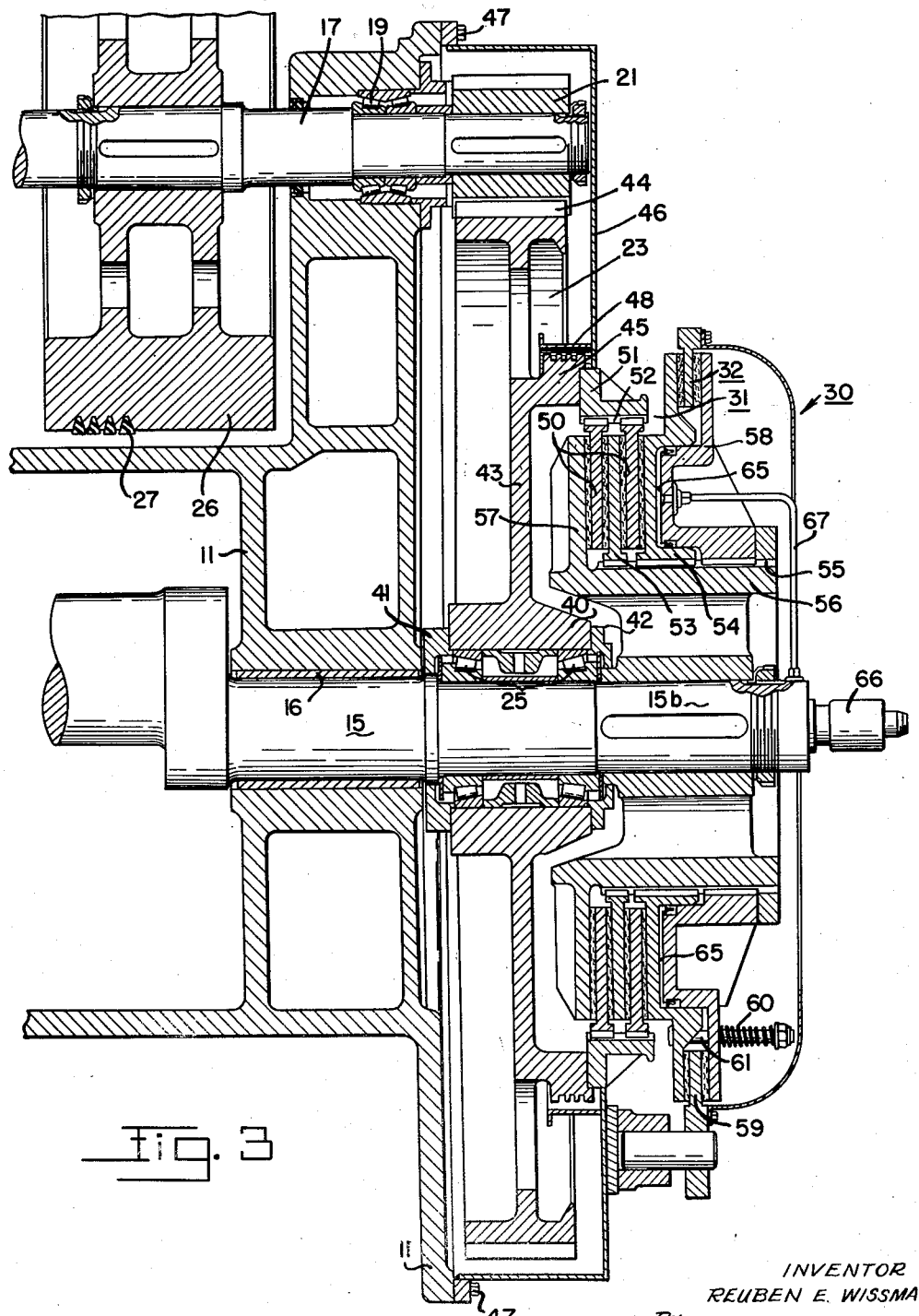
Figure 3 is an enlarged cross-sectional view of the clutch-brake assembly illustrated on the right-hand end of the press of Figure 2.

The clutch-brake unit 30 and its connection with the gear 23 is more particularly illustrated in Figure 3.

The gear 23 has a hub 40 which supports the gear on the roller bearings 25. The hub 40 receives the annular flanges 41 and 42 which hold the bearings 25 in place, and also provide a lubricant trap at each end of the hub 40 for the bearings 25. A center web 43 extends radially from the hub 40 and terminates in the gear periphery having the gear teeth 44 which cooperate with the gear teeth of the pinion 21. The web 43 has an annular projection 45 at one side thereof providing a mounting ring upon which a part of the clutch 31 is mounted.

A sheet metal enclosure 46 is provided around the gear 23 and the pinion 21, and is secured to the press frame 11 by means of suitable bolts 47. Thus, the gear 23 and the pinion 21 may be lubricated by a continuous flow of oil over the gears, the annular flange 48 on the inner surface of the enclosure 46 cooperating with the projection 45 on the web 43 to form a lubricant trap to prevent escape of lubricant from within the enclosure 46.

The clutch 31 consists of a plurality of clutch plates 50 that are carried by the annular ring 51 which is suitably secured to the projection 45 by any suitable devices, such as bolts. The plates 50 are carried in the annular ring 51 upon a spline 52.

The plates 50 cooperate with the clutch plate 53 and a plate 54 which provides a common operating plate between the clutch 31 and the brake 32. These plates 53 and 54 are carried on the spline 55 provided on the periphery of the hub 56 that is keyed to the crank shaft end 15b. The hub 56 has a radial flange 57 that provides a back plate for the clutch 31. A back plate 58 is also mounted on the hub 56 to cooperate with the operating plate 54 whereby the brake plate 59 may be secured therebetween.

The brake 32 is normally held in engaged position by a plurality of springs 60 that engage cooperating studs 61 to draw the plate 54 toward the back plate 58 for engagement of the plate 59 which engages the pin 59a secured to the enclosure 46.

To provide release of the brake 32 and engagement of the clutch 31, fluid under pressure is admitted into the annular chamber 65 provided between the plate 54 and the plate 58. Admission of fluid under pressure into this chamber causes movement of the plate 54 in a leftward direction, as viewed in Figure 3, to provide release of the brake and engagement of the clutch.

Figure 1:
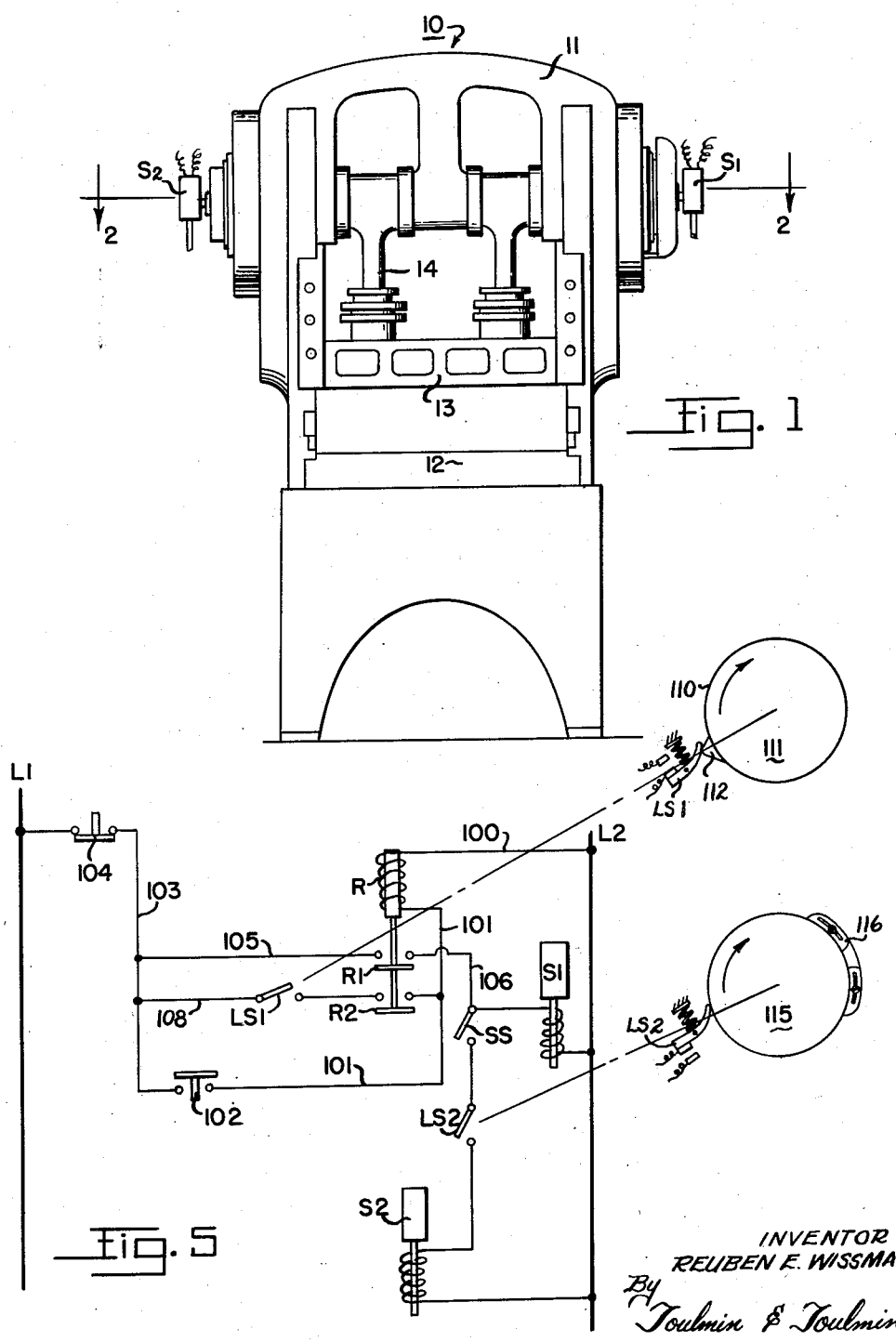
Figure 1 is an elevational view of a mechanical press incorporating features of this invention.

Admission of fluid under pressure into the chamber 65 is controlled by a suitable electrically operated air valve S-1, shown in Figure 1, air being admitted through the coupling 66 and the pipe 67 into the chamber 65.

Figure 4:
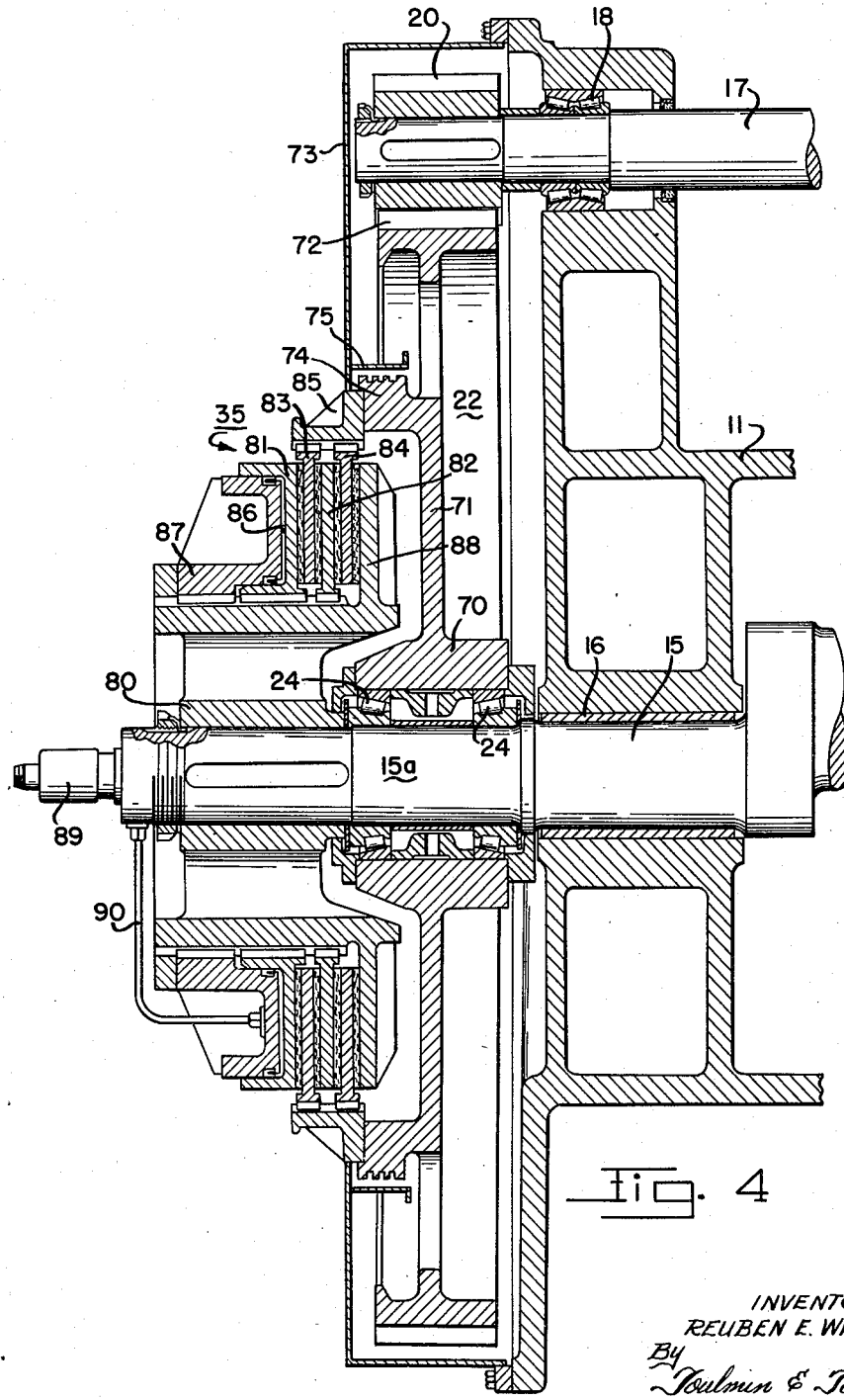
Figure 4 is an enlarged cross-sectional view of the clutch assembly shown on the left-hand end of the press of Figure 2.

The gear 22 and the clutch 25 cooperating therewith as mounted on the end 15a of the crank shaft 15 is constructed in the same manner as gear 23 and clutch 31, as will be apparent from Fig. 4 as compared with Fig. 3.

The gear 22 has a hub 70 that is mounted on the roller bearings 24 on the crank shaft end 15a. A center web 71 of the gear 22 terminates in the gear periphery and the teeth 72 that cooperate with the gear teeth of the pinion 20.

A sheet metal enclosure 73 encloses the gear 22 and the pinion 20 in the same manner as the enclosure 46 encloses gear 23 and pinion 21, and for the same purpose, the annular projection 74 cooperating with the inwardly directed flange 75 on the enclosure 73 to establish a lubricant trap.

The clutch 35 consists of the hub 80 that is keyed to the crank shaft end 15a. Clutch plates 81 and 82 are splined upon the hub 80 while clutch plates 83 and 84 are splined upon the annular ring 85 that is secured to the projection 74.

Operation of the clutch plates is occasioned by movement of the plate 81 as produced by the admission of fluid under pressure into the chamber 86 provided between the plate 81 and the stationary back plate 87. A stationary back plate 88 extends from the hub 80 radially at the opposite end of the hub.

Fluid under pressure is admitted into the chamber 86 through an electrically operated control valve S-2, shown in Figure 1, and through the coupling 89 and the pipe 90.

From the foregoing description it will be apparent that the clutch-brake unit 30 and the clutch 35 can be operated completely independently as controlled by the admission of fluid under pressure to the respective devices. Under conditions wherein the press is used only for light operations, operation of the clutch-brake unit 30 will suffice to control the stroke of operation of the crank shaft and the platen 13. However, the clutch 31 of the clutch-brake unit 30 is not designed to be of a capacity sufficient to transmit the entire torque load when the press is operating at maximum capacity. This is for the reason that to provide for sensitive control of the starting and stopping movements of the crank shaft, and thus the platen of the press, it is necessary that the clutch be not of a large type for the reason that large clutches are sluggish in their operation.

When the press is to be used for heavy operations, the clutch 35 is operated in cooperating working conditions with the clutch 31, the two clutches thus providing for maximum torque transmission to the crankshaft 15, and since the drive under these conditions is applied at both ends of the crankshaft 15, there will be a minimum of twist applied to the crankshaft between opposite ends, as distinguished from the condition which normally occurs when the entire torque is transmitted to a long crankshaft from one end thereof.

Since the clutch is placed between the crankshaft and the drive gear, at both ends of the crank shaft, and the drive gears rotate continuously, it will be seen that no particular tooth or teeth take the pressing load of the press constantly, but rather any tooth or teeth of the gear and the pinion will take the load of the press since the load will be applied through the clutch regardless of the position of the gears relative to the position of the crankshaft.

Further, the placement of clutches at each end of a crankshaft provides for an extremely sensitive overload control when the press is used either for light pressing operations or for heavy pressing operations.

If a single clutch is used to transmit the entire torque load of the press, it must be much larger than when the torque load is distributed between two clutches. Thus, the sensitivity of the single clutch to overload conditions will be increased, and the overload sensitivity is maintained even when light pressing operations are being performed. Thus, during all pressing operations, whether light or heavy, the torque transmission through the clutches can be balanced against the pressing load so that whenever the pressing load becomes too great, the clutches will slip and relieve the overload condition long enough to permit an operator to stop the press, if this be necessary.

It has been found in actual pressing operations that when the press is accidentally jammed on the pressing stroke that the forward momentum of the gear mass is sufficient to cause an actual bouncing which results in a slight reversing of the gears or flywheels producing relief in the press though it is in a stalled condition and giving the operator an opportunity to shut the motor off.

The clutches 31 and 35 can be synchronized in their operation so that they will operate simultaneously, or preferably the clutch-brake unit 30 is controlled to start and stop the crank shaft 15, and when the platen of the press is in a position for producing actual pressing operation, in which the full capacity of the press is desired, the clutch 35 can be operated at this time to add its driving effect to the crankshaft 15, thus aiding and supplementing the clutch 31.

In Figure 5 there is illustrated a schematic electrical wiring diagram by which the clutch-brake unit 30 can be operated alone, or it can be supplemented by the clutch 35 which will be operated during a controlled portion of the stroke of operation of the crankshaft 15, and thus platen 13 of the press.

In the wiring diagram of Fig. 5 the power lines are designated L-1 and L-2. The electrically operated air valves S-1 and S-2 receive their current supply under control of a relay R having the contactors R-1 and R-2. The relay R is connected in series with power lines L-1 and L-2 through the electric lines 100, 101, the start control button 102, the line 103 and the safety stop control button 104. Opening of the safety stop 104 de-energizes the entire electric circuit and causes the press to stop.

When the contactors R-1 and R-2 are closed, current is supplied to the air valve S-1 from power line L-1 through the electric lines 103, 105, contactor R-1 and electric line 106, thus energizing the air valve S-1 to open it and supply fluid under pressure to the chamber 65 of the clutch 31 and cause engagement of the clutch 31 and release of the brake 32. Simultaneously, a holding circuit will be made through the electric lines 100, 101 contactor R-2, and electric lines 108 and 103, the limit switch L-1 being closed at this time since it will be riding on the low surface 110 of the operating cam 11 that is suitably mounted on the crankshaft 15 for rotation therewith.

With the clutch 31 engaged, the press will operate through a complete stroke until the high point 112 of the cam 111 strikes the limit switch LS–1 to open it, and thus break the holding circuit through contactor R–2 which de-energizes the relay R and allows the contactors R–1 and R–2 to drop, which in turn de-energizes the air valve S–1. The springs 69 of the brake will then take over control and cause engagement of the brake to stop the crankshaft 15.

A selector switch SS is provided to selectively connect the air valve S–2 into the operating circuit when the clutch 35 is to be operated. With selector switch SS closed, current will be supplied to the electrically operated air valve S–2 under control of a limit switch LS–2 which in turn is controlled by a cam 115 having the cam high point 116. This cam 115 is also mounted on the crankshaft 15 for rotation therewith, and is positioned on the crankshaft in such a manner that the high point 116 of the cam will close the limit switch LS–2 when the platen of the press approaches its working position and the full capacity of the press is desired. When the platen of the press has passed through the actual work portion of the stroke, and is on its return to its upper position, limit switch LS–2 will be opened to de-energize the air valve S–2 and thus release the clutch 35 so that the brake 32 can take over its normal function of stopping the press when the platen reaches the top of its stroke, in the manner heretofore described.

While the apparatus disclosed and described herein constitutes a preferred form of the invention, yet it will be understood that the twin drive gears can be replaced with flywheels for a twin drive flywheel type press, and that other alternations can be made without departing from the spirit of the invention, and that those modifications that fall within the scope of the appended claims are intended to be included herein.

Having thus fully described my invention, what I claim as new and desire to secure by Letters Patent, is:

1. A dual drive mechanical press, including, a crankshaft, a drive wheel at each end of said crankshaft, power means drivingly connected with said drive wheels, independent clutch means between said power means and each end of said crankshaft, a brake operatively connected with said crankshaft to stop the same, and separate control means operatively connected with said clutches for independent actuation of each clutch, and other means actuated in predetermined relation to the movement of said crankshaft for initiating operation of at least one of said separate control means.

2. In a geared type mechanical press, a crank shaft, a gear mounted on each end of said crank shaft and journalled thereon for free rotation with respect to said crank shaft, a back shaft including gear means thereon connected with each of the aforementioned gears to drive the same simultaneously, means on said back shaft for receiving power from a power source to drive said back shaft and said gears, a clutch mounted on said crank shaft at one end thereof adjacent the gear at that end of the drive shaft drivingly interconnecting the said gear and the crank shaft, a clutch-brake unit mounted on said crank shaft adjacent the gear at the opposite end thereof with the clutch drivingly interconnecting the said gear and the crank shaft, and the brake connecting the crank shaft with a stationary part of the press to stop the same, control means connected with said first clutch to regulate operation thereof, control means connected with said clutch-brake unit to control operation thereof with alternate operation of the clutch and brake, and control means connected with the aforementioned control means synchronizing operation thereof during at least a part of the stroke operation of the press.

3. In a geared type mechanical press, a crank shaft, a gear mounted on each end of said crank shaft and journalled thereon for free rotation with respect to said crank shaft, a back shaft including gear means thereon connected with each of the aforementioned gears to drive the same simultaneously, means on said back shaft for receiving power from a power source to drive said back shaft and said gears, a clutch mounted on said crank shaft at one end thereof adjacent the gear at that end of the drive shaft drivingly interconnecting the said gear and the crank shaft, a clutch-brake unit mounted on said crank shaft adjacent the gear at the opposite end thereof with the clutch drivingly interconnecting the said gear and the crank shaft, and the brake connecting the crank shaft with a stationary part of the press to stop the same, control means connected with said first clutch to regulate operation thereof, control means connected with said clutch-brake unit to control operation thereof with alternate operation of the clutch and brake, and control means connected with the aforementioned control means synchronizing operation thereof during at least a part of the stroke operation of the press, said last-mentioned control means including selector means for selecting operation of one or both of said clutches.

4. In a geared type mechanical press, a crank shaft, a gear at each end of said crank shaft and journalled for freedom of rotation relative to said crank shaft, a back shaft having gears thereon drivingly connected with said aforementioned gears, means on said back shaft for receiving power to drive the same, a separate clutch adjacent each gear, each of said clutches having a plurality of clutch plates some of which are carried by the gear thereadjacent and others of which are carried by said crank shaft for drivingly interconnecting the gear with the crank shaft, a brake adjacent one of said clutches and having a plurality of brake plates some of which are carried by said crank shaft and other of which connect with a stationary element of said press, each of said clutches having fluid actuated means for operating the same independently, and said brake having resiliently acting means for operating it.

5. In a geared type mechanical press, a crank shaft, a gear at each end of said crank shaft and journalled for freedom of rotation relative to said crank shaft, a back shaft having gears thereon drivingly connected with said aforementioned gears, means on said back shaft for receiving power to drive the same, a separate clutch adjacent each gear, each of said clutches having a plurality of clutch plates some of which are carried by the gear thereadjacent and others of which are carried by said crank shaft for drivingly interconnecting the gear with the crank shaft, a brake adjacent one of said clutches and having a plurality of brake plates some of which are carried by said crank shaft and other of which connect with a stationary element of said press, each of said clutches having fluid actuated means for operating the same independently, said brake having resiliently acting means for operating it, and control means connected with said actuating means for said clutches rendering them active selectively.

6. In a geared type mechanical press, a crank shaft, a gear at each end of said chank shaft and journalled for freedom of rotation relative to said crank shaft, a back shaft having gears thereon drivingly connected with said aforementioned gears, means on said back shaft for receiving power to drive the same, a separate clutch adjacent each gear, each of said clutches having a plurality of clutch plates some of which are carried by the gear thereadjacent and others of which are carried by said crank shaft for drivingly interconnecting the gear with the crank shaft, a brake adjacent one of said clutches and having a plurality of brake plates some of which are carried by said crank shaft and other of which connect with a stationary element of said press, each of said clutches having fluid actuated means for operating the same independently, said brake having resiliently acting means for operating it, control means connected with said actuating means for said clutches rendering them active selectively, and including control means for rendering active one of said clutches during only a part of the stroke of operation of the press.

7. In a geared type mechanical press, a crank shaft, a gear at each end of said crank shaft and journalled for freedom of rotation relative to said crank shaft, a back shaft having gears thereon drivingly connected with said aforementioned gears, means on said back shaft for receiving power to drive the same, a separate clutch adjacent each gear, each of said clutches having a plurality of clutch plates some of which are carried by the gear thereadjacent and others of which are carried by said crank shaft for drivingly interconnecting the gear with the crank shaft, a brake adjacent one of said clutches and having a plurality of brake plates some of which are carried by said crank shaft and others of which connect with a stationary element of said press, each of said clutches having fluid actuated means for operating the same independently, said brake having resiliently acting means for operating it, control means connected with said actuating means for said clutches rendering them active selectively, and including control means for rendering active one of said clutches during only the work portion of the stroke of the press.

REUBEN E. WISSMAN.

REFERENCES CITED

The following references are of record in the file of this patent:

UNITED STATES PATENTS

| Number | Name | Date |
| --- | --- | --- |
| 744,423 | Steckel | Nov. 17, 1903 |
| 1,077,679 | Davis | Nov. 4, 1913 |
| 2,065,820 | Mellon | Dec. 29, 1936 |
| 2,159,250 | Brantly | May 23, 1939 |
| 2,250,822 | Williamson | July 29, 1941 |
| 2,366,272 | Le Tourneau | Jan. 2, 1945 |
| 2,505,600 | Wissman | Apr. 25, 1950 |

FOREIGN PATENTS

| Number | Country | Date |
| --- | --- | --- |
| 831,900 | France | Sept. 15, 1938 |